United States Patent [19]

Skalko

[11] 4,448,368
[45] May 15, 1984

[54] CONTROL FOR TAPE DRIVE SYSTEM

[75] Inventor: Edward S. Skalko, Cromwell, Conn.

[73] Assignee: Raymond Engineering Inc., Middletown, Conn.

[21] Appl. No.: 361,116

[22] Filed: Mar. 23, 1982

[51] Int. Cl.³ .............. B65H 77/00; G11B 15/32; G11B 15/48; H02P 7/68

[52] U.S. Cl. ............... 242/186; 242/75.51; 242/191; 242/203; 318/6; 318/7

[58] Field of Search ............. 242/200, 75.51, 75.52, 242/75.5, 201, 202, 203, 186, 191; 318/6, 7

[56] References Cited

U.S. PATENT DOCUMENTS

| | | | |
|---|---|---|---|
| 2,874,917 | 2/1959 | Pell | 242/75.51 |
| 3,348,107 | 10/1967 | Hamby | 242/75.51 X |
| 3,863,117 | 1/1975 | Paschetto | 318/7 |
| 3,910,521 | 10/1975 | O'Callaghan et al. | 242/75.51 |
| 3,913,866 | 10/1975 | Hankins | 242/75.51 X |
| 4,015,799 | 4/1977 | Koski et al. | 242/203 |
| 4,065,074 | 12/1977 | Anderson et al. | 242/75.51 X |
| 4,172,231 | 10/1979 | d'Alayer de Costemore d'Arc et al. | 242/75.51 X |
| 4,245,897 | 1/1981 | Beauviala et al. | 242/75.51 X |
| 4,256,996 | 3/1981 | Brooks et al. | 242/75.51 X |
| 4,280,081 | 7/1981 | Dinger et al. | 318/6 |

Primary Examiner—Stuart S. Levy
Assistant Examiner—Scott J. Haugland
Attorney, Agent, or Firm—David S. Fishman

[57] ABSTRACT

A control for a digital cassette tape drive maintains constant linear tape velocity at the playback head, constant tape tension, provides compensation for inertial imbalances and provides for minimal stop time. Constant linear velocity is obtained by computing actual velocity at the head and using the computed information to control takeup motor speed. Tape tension control is achieved by energizing the payout hub drive motor with a voltage which is a function of hub rotational speed and motor current.

38 Claims, 2 Drawing Figures

CONTROL FOR TAPE DRIVE SYSTEM

BACKGROUND OF THE INVENTION

(1) Field of the Invention

The present invention relates to the movement of a flexible media from one reel or spool to another, during the performance of some operation on the media during the transfer, and particularly to the exercise of control over the velocity of and tension imposed upon the media during the movement thereof. More specifically, this invention is directed to an electronic control for a reel-to-reel drive system, for example a tape cassette drive, which maintains a constant tape velocity at a recording or pick up head during normal operation, maintains a constant safe level of tension on the tape, quickly brings the tape to speed upon receipt of a start command and quickly stops the tape movement upon receipt of a stop command while preventing the transient tension from approaching the yield point of the tape. Accordingly, the general objects of the present invention are to provide novel and improved methods and apparatus of such character.

(2) Description of the Prior Art

While not limited thereto in its utility, the present invention has been found to be particularly well suited for use in a tape transport intended for use in cassette recorders, particularly cassette recorders intended for employment as digital magnetic memories in data processing apparatus. The environment of a digital cassette tape drive imposes a number of requirements on the tape transport. Thus, in order to maximize the data storage capability of the tape, the linear velocity of the tape at the record/playback head must be constant. The maintainence of the desired constant linear velocity is rendered difficult because the radial hub velocity varies as a function of the instantaneous combined diameter of the takeup reel and the tape stored thereon. Thus, the problem becomes that of finding a way to determine and subsequently maintain constant the actual linear type velocity. The solution to this problem must be capable of being implemented reliably, inexpensively and with volumetric efficiency. An associated problem, which must be addressed to insure that data will be recorded and retrieved with a high degree of accuracy and that damage to the recording media will be minimized, is the maintainence of a constant and safe level of tension on the tape in the region between the pay-out (supply) reel and takeup reel. Failure to maintain a constant tape tension will, for example, result in uneven application of the tape against the record/playback head which results in errors in the data processing.

Continuing to discuss the requirements of a tape transport which is suitable for use in a digital cassette tape drive, as the tape is transferred from reel to reel there will be inertial imbalances. Since the tape should be brought up to its constant working velocity as quickly as possible, and the system must remain stable, compensation must be provided for these inertial changes.

Yet another highly desirable characteristic of a tape transport for digital data storage applications is minimal stop time. In other words, the tape motion must be arrested as quickly as possible but this must be accomplished gently so that the transient tension does not approach the yield point of the tape thus causing permanent damage.

Prior art tape transports have not addressed all of the above-briefly discussed problems simultaneously and provided a solution thereof which is characterized by a high degree of reliability, moderate expense and good volumetric efficiency. Solutions to some of the above-discussed problems have been proposed but apparatus embodying the solutions have been characterized by one or more deficiencies.

Cassette drives for memory storage in computer systems intially employed either one or two capstans with associated drive motors and single or bidirectional speed control was sought through the exercise of control over the capstan drive motors. These early digital cassette tape drives additionally had a pair of reel drive motors for winding the tape in the cassette. The reel drive motors were also used for fast forward and rewind. The deficiencies of capstan drive systems include complexity, cost and excessive tape wear. For example, capstan drive machines meter the tape by capturing it between a pinch roller and the output shaft of the associated capstan drive motor. This results in actual tape contact which reduces tape life through wear and increases system contaminants which in turn, reduces data integrity.

More recent tape transports designed for digital applications have eliminated the capstan motors and regulate tape speed by exercising control over the reel drive motors. In order to overcome the above-discussed problem of tape velocity variation with takeup reel diameter, various techniques have been proposed for measuring actual tape velocity at the recording head. Thus, for example, it has been proposed to use a prerecorded clock track written on the tape and to generate a tape speed signal by monitoring this clock track. While this approach is operable, it significantly reduces the data storage capacity of the tape. It has also been proposed to employ a low inertia tachometer or optical encoder which is attached to the shaft of a tape idler wheel which contacts the tape at a point adjacent the record/playback head. The velocity signal provided by the tachometer or encoder, being proportional to tape velocity, may be used as a feedback signal in a drive motor servo loop. The employment of a tape idler wheel and associated velocity sensor, however, increases the system complexity by adding another mechanical assembly and also increases system inertia. Also, as in the case of the capstan drive systems mentioned above, the contact between the idler wheel and the oxide side of the tape results in tape wear, an increase in system contaminants and thus a reduction in data integrity. It has additionally been proposed to employ the back emfs of the reel drive motors as a measure of motor speed and to subsequently approximate tape velocity as a function of the thus sensed "speeds".

The typical prior art approach to controlling tape tension is to simply permit the motor which drives the payout reel to be rotated by the motion imparted to the tape whereupon the motor will act as a generator and produce a voltage. This voltage is applied across a load resistor thereby resulting in a current flow through the motor which creates a retarding torque. However, since the angular velocity of the rotor of the payout motor varies with the amount of tape on the payout reel, this approach results in the retarding torque, and thus also the tension, varying with position. In fact, employing a standard Philips cassette, the tension will change by $(2.4)^2$ and such a large change is totally unacceptable. It has also been proposed to employ, in those systems where payout motor speed is calculated from a measure of back emf, a function generator which will provide an output signal which may be utilized to control the power applied to the payout reel motor for the purpose of insuring that the braking will not be excessive and damage the tape. Such controls, however, do not maintain substantially constant tension but rather may be looked upon merely as rather complex safety systems. A further prior art method of tension control adjusts the voltage applied to the payout motor as a function of the speed of the take-up motor in an open-loop system, the speed of the drive motor being directly proportional to the torque of the payout motor with constant tension. Tape tension is not actually measured or calculated and this method of tension control is totally ineffective during starting.

The problem of inertial imbalance, while known, has largely been ignored in the prior art.

The achievement of the stopping of tape motion quickly but without imposing unduly high transient tension on the tape has similarly received little attention in the prior art. Typically, when it is desired to stop the tape, the windings of the takeup reel drive motor are short circuited and some control is exercised over the payout reel drive motor. In the prior art it has been customary to apply either a fixed voltage or a constant current to the payout motor during stopping. The use of a fixed voltage, which is applied either for a fixed time period or until the tape velocity feedback indicates that the tape has almost stopped, is the easiest technique to implement. However, since the generated back emf changes by a factor of 2.4, again considering a standard Philips type cassette, and the effective hub diameter changes by the same factor, the applied stop tension may vary by as much as a factor of five and one half. This is too great a variation and results in long stop times. The use of a constant current produces a constant torque during stopping but the tape tension will still vary by a factor of 2.4. Further, the application of a constant current to the payout motor is a more difficult technique to implement in hardware.

SUMMARY OF THE INVENTION

The present invention overcomes the above-discussed and other deficiencies and disadvantages of the prior art by providing a novel and improved technique for exercising control over the transfer of a flexible media, and specifically a magnetic tape, between a pair of reels. The invention also encompasses an adaptive control employing novel circuitry for implementing the aforementioned unique technique. The technique and apparatus of the present invention are particularly well suited for use in data storage for computer systems and in a preferred embodiment the present invention comprises a digital cassette tape drive.

In accordance with one embodiment of the present invention encoders are employed to provide signals commensurate with the actual instantaneous speed of the payout reel and takeup reel drive motor output shafts. These sensed speeds are converted into digital format and delivered to a microprocessor which computes, in the manner to be described in detail below, the tape velocity at the record/playback head. This velocity signal is converted to analog form, compared to a speed reference signal to provide an "error" voltage and the error voltage employed to control the takeup reel drive motor.

The preferred embodiment of the invention employs optical encoders for speed sensing. However, other devices which provide an output signal having a frequency which varies with speed, back emf speed sensors or analog tachometers could be utilized.

Tape tension control is achieved, in accordance with a preferred embodiment of the present invention, by providing a signal commensurate with the payout reel motor current and multiplying this current by a signal commensurate with payout reel motor output shaft rotational speed. In the preferred embodiment the multiplication is accomplished by pulse width modulation of the output signal of the optical encoder. The output of the pulse width modulator is converted to a DC voltage which is employed to control the payout reel drive motor.

The above-mentioned takeup motor speed "error" signal is, prior to delivery to the motor, subjected to compensation in order to provide high low frequency gain and good system band-width. In accordance with a preferred embodiment, this compensation also includes the variation of the speed "error" signal to take into account inertial changes on start-up. Thus, the ratio of the periods of the optical encoder output signals is determined and this ratio is compared with stored predetermined values commensurate with a plurality of inertial imbalances. Each time the tape motion is stopped, the stored value closest to the most recent encoder period ratio is stored in a memory. Upon completion of stopping, the value stored in memory is employed to control the switching of one of a plurality of resistors into the compensation network for the speed "error" amplifier. Each resistor value is optimized to provide the fastest and yet stable response over the range of the particular inertial imbalance commensurate with the tape position indicated by the last determined ratio of encoder periods.

A preferred embodiment of the present invention also includes novel means for obtaining the fastest tape stop time commensurate with insuring that the transient tension during stopping does not approach the yield point of the tape. This is achieved, in part, by generating a voltage for application to the payout motor which varies linearly with tape position. The duration of the time which this voltage is applied is controlled by a microprocessor which stores a count commensurate with present motor speed at the time a stop command is given. The microprocessor determines the time it takes the motor speed to be reduced by 50%, i.e., twice the original count, and holds the applied voltage for an additional equal amount of time.

BRIEF DESCRIPTION OF THE DRAWING

The present invention may be better understood and its numerous objects and advantages will become apparent to those skilled in the art by reference to the accompanying drawing wherein like reference numerals refer to like elements in the two FIGURES and in which.

DESCRIPTION OF THE PREFERRED EMBODIMENT

Figure 1:
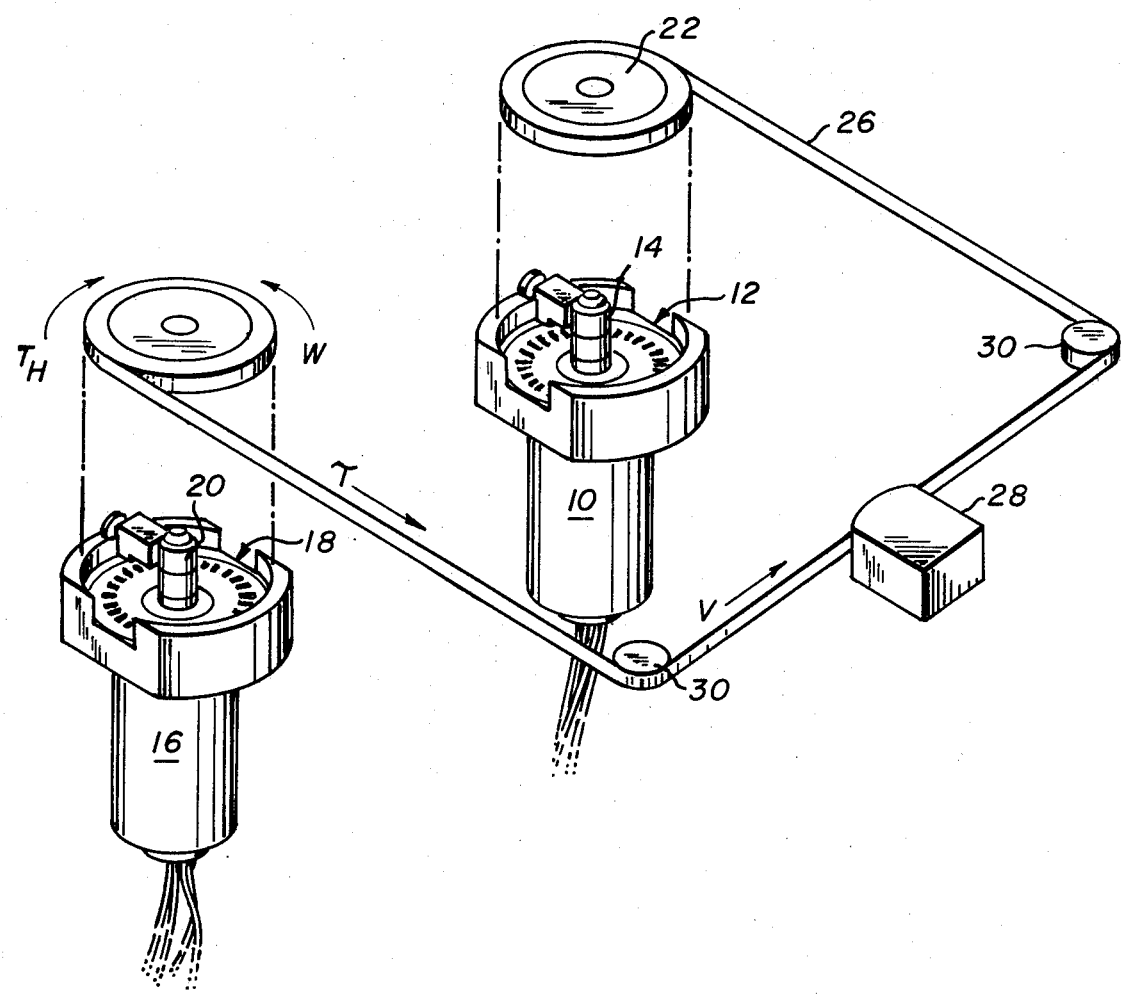
FIG. 1 is a perspective, schematic view of the mechanical and electromechanical components of a preferred embodiment of the present invention.
Figure 2:
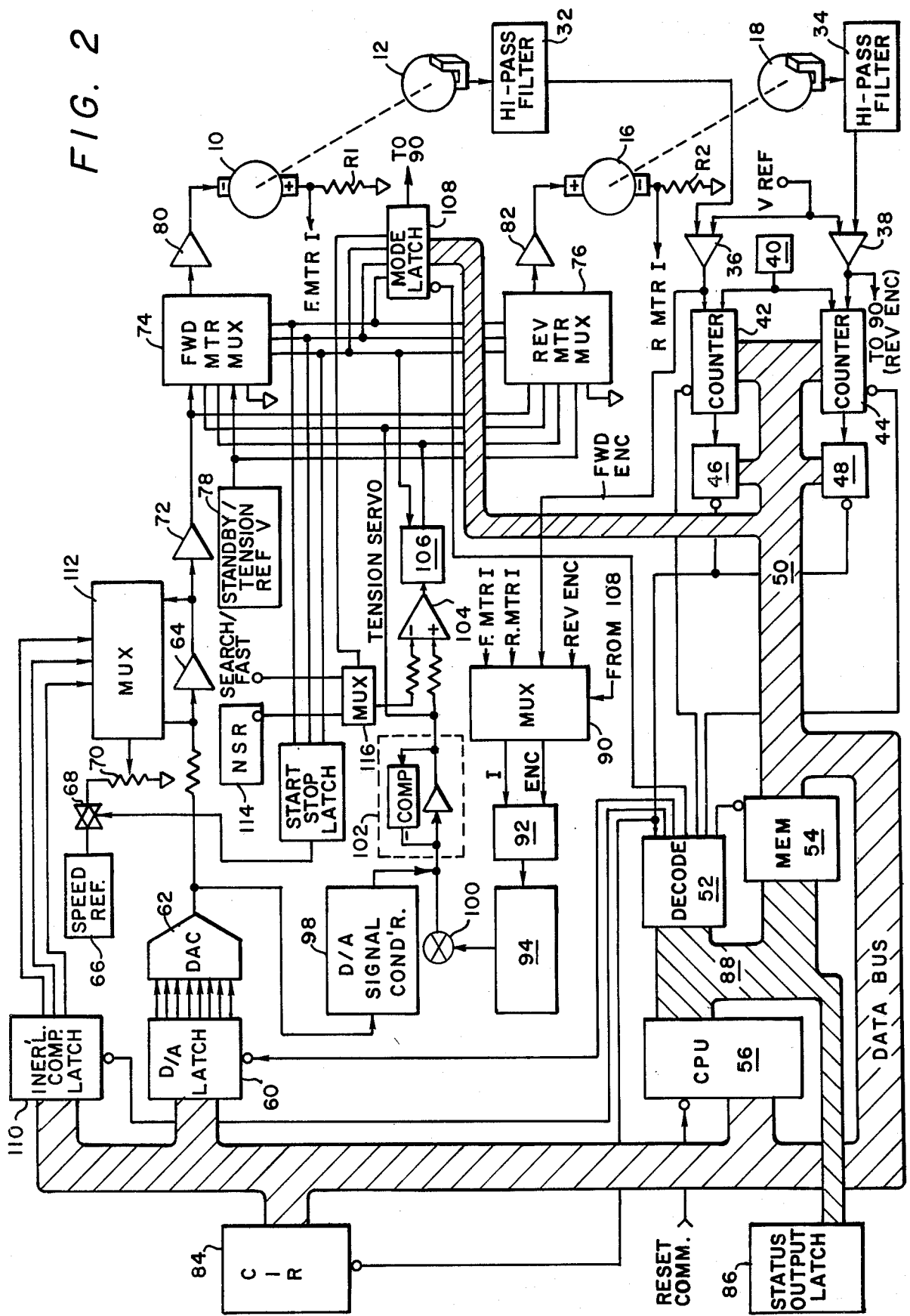
FIG. 2 is a circuit block diagram of a preferred embodiment of the present invention which may be employed to control the motors of the drive system of FIG. 1.

Referring now jointly to FIGS. 1 and 2, a preferred embodiment of a digital cassette tape drive in accordance with the present invention will be described. However, since it will facilitate understanding of the invention, those constraints imposed upon the control system by the cassette will first be discussed. A cassette for information interchange which is manufactured in accordance with standard ANSI X3.48-1977 published by the American National Standards Institute (ANSI) will include a magnetic tape of known length and thickness. As will be explained below, once the parameters of the cassette are known, and certain operating parameters are measured, equations can be solved to determine the appropriate instantaneous level of take-up reel drive motor energization which will maintain a constant tape velocity at the record/playback head.

It should first be observed that the instantaneous tape velocity, v, will be the same for both reels. Thus, $$v = w_1 r_1 = w_2 r_2 \quad (1)$$

where:
- v = tape velocity (in./sec.)
- $w_1$ = take-up reel velocity (radians/sec.)
- $r_1$ = take-up reel pack radius (in.)
- $w_2$ = payout reel velocity (radians/sec.)
- $r_2$ = payout reel pack radius (in.)

Equation (1) may also be expressed as:

$$r_1 = v/w_1 \text{ and } r_2 = v/w_2 \quad (1a)$$

The amount of tape in the cassette will, pursuant to the above-mentioned standard, be constant and related to tape length, L, and tape thickness, t. Thus, the amount of tape may be expressed as follows:

$$Lt = \rho[(r_2^2 - r^2) + (r_1^2 - r^2)] \quad (2)$$

Where r is the hub radius (in.). Equation (2) may be reduced as follows:

$$Lt/\pi = r_2^2 + r_1^2 - 2r^2 \quad (3)$$

$$Lt/\pi + 2r^2 = r_1^2 + r_2^2 \quad (4)$$

Since the quantities on the left hand side of equation (4) are all known constants, equation (4) may be restated as follows:

$$r_1^2 + r_2^2 = K^2 \quad (5)$$

By substituting equation (1a) into equation (5), the following is obtained:

$$\frac{v^2}{w_1^2} + \frac{v^2}{w_2^2} = K^2 \quad (6)$$

$$v^2 \left( \frac{1}{w_1^2} + \frac{1}{w_2^2} \right) = K^2$$

$$v^2 = \frac{K^2}{\frac{1}{w_1^2} + \frac{1}{w_2^2}} = \frac{K^2}{\frac{w_1^2 + w_2^2}{w_1^2 w_2^2}} = \frac{K^2 w_1^2 w_2^2}{w_1^2 + w_2^2}$$

Therefore:

$$v = \frac{K w_1 w_2}{\sqrt{w_1^2 + w_2^2}} \quad (7)$$

Equation 7, as will be obvious to those skilled in the art, is an expression which equates tape velocity, v, to the radial velocities, respectively $w_1$ and $w_2$, of both hubs.

In accordance with the disclosed embodiment of the present invention, the hub speed of each reel is obtained using an optical encoder. The drive motor/encoder subassemblies may be seen from FIG. 1 and are indicated schematically in FIG. 2. Thus, a first drive motor, which may be considered the forward drive, is indicated at 10 and includes a housing extension wherein an optical encoder, indicated generally at 12, is positioned. The optical encoder comprises a disc with radially etched slots which is affixed to and thus rotates with the motor shaft, i.e., with the reel engaging hub 14. The slots in the disc interrupt the light path between a light emitting diode and a photo transistor whereby the photo transistor provides an electrical output signal in the form of a series of pulses having a repetition rate commensurate with hub angular velocity. Similarly, the second motor 16, which may be considered the reverse drive motor, has an optical encoder 18 associated therewith for providing an electrical output signal commensurate with the radial velocity of its hub 20. Hub 14 will engage a first reel 22 of a cassette whereas hub 20 will engage cassette second reel 24. The magnetic tape 26 is stored on and transferred between reels 22 and 24 and, during the transfer, will move past a read/write head 28. Proper positioning of tape 26 with respect to head 28 will typically be accomplished through the use of a pair of idler wheels 30 which are part of the cassette package.

The d.c. components of the output signals provided by encoders 12 and 18 are removed in respective filters 32 ad 34. The output signals from filters 32 and 34 respectively are applied as first inputs to comparators 36 and 38. The second input to these comparators comprises a reference voltage. The comparators translate the filtered output of the optical encoders into "logical" square waves. The square wave output signals from comparators 36 and 38 are respectively employed to gate an input signal provided by the system clock 40 into respective counter/latch circuits 42 and 44. In a preferred embodiment the operation is such that the output of the counters 42 and 44 will be proportional to the period of the output frequency of the associated optical encoder. Should either of the counters 42 or 44 overflow, as is likely upon generation of a "start" command when the motor performing the tape drive function is being brought up to speed, the overflow will be latched into an overflow register. Thus, an overflow register 46 is associated with counter/latch 42 and an overflow register 48 is associated with counter/latch 44. The outputs of the counter/latch circuits 42 and 44 and the overflow registers 46 and 48 are applied to a data bus 50 and, upon addressing of the counters by an address decoder 52 pursuant to a program stored in memory 54, the signals commensurate with encoder output period will be inputted to a microprocessor 56 for the purpose to be described below. It is to be noted that, if an overflow is detected, the computation is aborted and a minimum value is outputted to a digital-to-analog converter 62.

The actual tape velocity is computed as follows. The number of slots "A" in the disc of each of encoders 12 and 18 is known. As explained above, the output of the counters 42 and 44 will be a binary number proportional to the period of the output frequency of the associated encoder. Accordingly:

$$A = \text{cycles/revolution} \quad (8)$$

$$A(\text{cy/rev}) \times 1/2\pi \ (\text{rev/rad}) = A/2\pi \ (\text{cycles/radian}) \quad (9)$$

Inserting the radial velocity of the motor, w, one obtains:

$$w \ (\text{rad/sec}) \times A/2\pi \ (\text{cy/rad}) = wA/2\pi (\text{cy/sec}) \quad (10)$$

which is the encoder output frequency (f). Since the outputs of counters 42 and 44 are a measure of one half of the encoder period, $$N = \lambda/2 \quad (11)$$

where N is the counter output and λ is the encoder period. Thus:

$$f = 1/2N \quad (12)$$

Substituting equation (12) into equation (10), $$wA/2\pi = 1/2N \quad (13)$$

Therefore, $$w = \pi/NA \quad (14)$$

Substituting equation (14) into equation (7), $$v = \frac{K_1}{\sqrt{N_1^2 + N_2^2}} \quad (15)$$

where $K_1 = K \pi/A$ Thus, as indicated by equation (15), tape linear velocity v is a function of the outputs of counters 42 and 44. This new constant is stored in memory 54 so that an exact calculation is maintained. Accordingly, since tape velocity varies as a function of the two hub speeds as represented by the outputs of the counters 42 and 44, by inputting the forward and reverse encoder counter outputs to microprocessor 56, the microprocessor can solve equation (15) and provide an output signal commensurate with actual tape velocity, v, on data bus 50. This velocity signal will be delivered, via a latch 60, which may comprise a dual four bit D-type latch, into a digital-to-analog converter 62. Convertor 62 may be any device which accurately converts the digital output of microprocessor 56 to an analog signal. The output of converter 62 is thus a DC signal having a magnitude commensurate with the actual instantaneous linear velocity of the tape. This velocity signal may, using conventional servo techniques, particularly classical forward loop compensation, be employed to control the voltage of the operating drive motor and thus control tape velocity.

It should be noted that the encoder period $N = \lambda$ rather than $N = \lambda/2$ may be employed. Thus, as long as the counter output is inversely proportional to encoder frequency, the contents of program memory 54 can be modified to correlate to changes in system parameters.

The output of DAC 62 is delivered as an input to a summing junction which is connected to the input of an amplifier 64 in a compensation circuit. The amplifier 64 functions as an error amplifier and pprovides an output signal corresponding to the difference between the output of DAC 62 and a velocity reference signal provided from a source 66, the reference signal being delivered to the compensation circuit via an analog switch 68 and being adjustable by means of a potentiometer 70. The feedback circuit for amplifier 64, which is in compensation network 112, provides lead-lag compensation and also provides high low frequency gain and good system band-width. Additionally, as will be explained in detail below, the network 112 provides compensation for the mechanical response of the tape system which includes the motor and changing inertial load.

The "error" signal which appears at the output of the amplifier 64 is amplified, in an amplifier 72, and applied to a pair of mode multiplexers 74 and 76. Multiplexer 74 is the forward multiplexer and thus is associated with motor 10. Multiplexer 76 is the reverse multiplexer and is thus associated with motor 16. The mode multiplexers 74 and 76 are controlled, through a mode latch 108, by microprocessor 56. Mode latch 108 may, for example, comprise a four bit D-type latch. The microprocessor will examine the command inputs and tape leader status, determine the appropriate mode of operation, and set the mode. There are three basic operational modes: standby, run and stop. In the standby mode, a positive voltage supplied by tension reference voltage source 78 is applied to both motors through associated multiplexers 74 or 76. The standby voltage will cause sufficient torque to be applied to the hubs of both motors to remove any tape loops but the voltage will be equally applied so that no tape will be pulled past the read-/write head 28. In the run mode, the drive motor speed is controlled by the speed servo, particularly the output of amplifier 72, and the payout motor torque is controlled, in the manner to be described below, by a tension servo system. The signals applied to the motors in the run mode are, after passage by their respective multiplexer, amplified in a power amplifier, the power amplifiers for motors 10 and 16 respectively being indicated at 80 and 82. Upon receipt of a stop command, both motors go into a stop mode for a period of time. In the stop mode the winding of the motor which has been functioning as the drive motor is short circuited and a "plug" voltage is applied to energize the payout motor.

Before discussing the tape tension control of the present invention, it is to be noted that a command input register 84 is also connected to data bus 50 while a status output latch 86 is, in addition to the address decoder 52, memory 54 and microprocessor 56, connected to the address bus 88. The function of the command input register 84 is to take commands from the user to determine the mode of operation of the tape drive. The function of the status output latch 86 is to tell the user what is happening; the latched outputs being logic levels commensurate with such conditions as tape leader position.

As mentioned above, the most prevalent technique in the prior art for controlling tape tension is to allow the payout motor to function as a generator, rotation of the rotor of the payout motor resulting from the tape motion, and applying the voltage thus generated across a load resistor to thereby cause current flow through the motor and create a retarding torque. Again considering a Philips type cassette meeting the ANSI standard, the diameter of each tape pack, i.e., reel, will change by a factor of 2.4. Since the system is desirably running at constant tape speed, the radial velocity of the hubs, and thus of the motor rotors, will change by the same factor. Therefore, using a fixed load resistor, the tension would change by $(2.4)^2$. A change of this magnitude is unacceptable and, therefore, a tension control signal must be generated. Since system friction is substantially constant, the system friction including that between the tape and read/write head, may be neglected. Thus, tape tension may be expressed as follows:

$$\tau = T_H/r_2 \qquad (16)$$

where $T_H$ = hold back torque $r_2$ = payout reel pack radius

Assuming a constant tape velocity, $$v = wr_2 \qquad (17)$$

and $$r_2 = v/w$$

where w is the angular velocity of the payout motor output shaft and is directly proportional to the output frequency of the optical encoder associated with the payout motor. Thus, the radius, $r_2$, is a function of encoder frequency. The hold back torque $T_H$ is a function of the motor and may be expressed as follows:

$$T_H = K_T \times i_m \qquad (18)$$

where $K_T$ = motor torque constant
$i_m$ = motor current

As in the case of equation (16), equation (18) neglects friction. It may be seen from equation (18) that, since the torque constant $K_T$ is fixed, the hold back torque $T_H$ is a function of the motor current. By substituting equations (17) and (18) into equation (16), the following is obtained:

$$\tau = \frac{K_T i_m w}{v} \qquad (19)$$

Since $K_T$ is a constant and v is also a constant when the tape is at operating speed, equation (19) may be rewritten as folows:

$$\tau = K_1[i_m \times w] \qquad (20)$$

where $K_1 = K_T/v$

Thus, as may be seen from equation (20) an expression for tape tension has been derived. The motor current $i_m$ can be measured directly by measuring the voltage drop across either of the appropriate sensing resistors R1 or R2. The radial velocity w is obtained directly from the optical encoder. The sensing resistor voltage drops and optical encoder outputs are delivered as inputs to a further multiplexer 90. Multiplexer 90, also operating under the control of mode latch 108, switches the appropriate motor speed and current signals to a tension feedback multiplier 92. The multiplier 92, in the preferred embodiment, comprises a pulse width modulator. In operation, the trailing edges of the encoder output signal will set a monostable multivibrator and the output pulse width of the multivibrator will be determined by the magnitude of the signal commensurate with motor current. The output of the multiplier 92 is delivered to a low pass filter 94 which converts the input duty cycle to a proportional DC voltage. The output of filter 94 is a signal which, using conventional servo techniques, may be applied to energize the payout motor to achieve substantially constant tape tension when the tape has achieved steady state velocity.

The tension feedback signal, as provided at the output of filter 94, is not accurate during tape acceleration and deceleration since equation (20) above is based upon the assumption of constant velocity. In order to provide the appropriate tension during acceleration, the linear velocity signal provided at the output of DAC 62 is biased to become the tension reference input to the tension servo. This biased signal is amplified by means of a signal conditioning amplifier 98 and summed, at a summing junction 100, with the tension feedback signal provided at the output of filter 94. The signal conditioning amplifier 98, in addition to amplifying the biased tape velocity signal, also functions as an active low-pass filter. The summed signals are applied as the input to a compensation/error circuit 102 which is an active lag-lead filter. Circuit 102 provides an output signal which corresponds to the difference between the output of digital-to-analog signal conditioner 98 and the tension feedback signal from filter 94. The output of the amplifier in compensation circuit 102 is applied directly as an input to the mode multiplexers 74 and 76. The multiplexers, under the control of mode latch 108, switch the signal to the power amplifier of the payout motor. The signal appearing at the output of filter 94 is thus summed with a variable tape velocity reference signal and delivered, via the compensation/error circuit 102 and one of the multiplexers, as the energizing input to the power amplifier of the payout motor during start-up through steady state operation.

During deceleration the tape must be stopped gently so that the transient tension does not approach the yield point of the tape thus causing permanent damage. In accordance with the present invention, a voltage which results in a constant maximum tension is produced and applied to the power amplifier of the payout motor while the windings of the drive motor are short circuited. Again assuming a standard Philips type cassette, and starting with the maximum tension desirable and the minimum and maximum reel diameters, it may be seen that:

$$\tau(D_{min}/2) = T_{min} \qquad (21)$$

and $$\tau(D_{max}/2) = T_{max} \qquad (22)$$

where $\tau$ is tape tension and T is motor torque. The torques require an applied current related by the motor torque constant. Thus:

$$i_{min} = T_{min}/K_T \qquad (23)$$

$$i_{max} = T_{max}/K_T \qquad (24)$$

Equations (23) and (24) give the desired motor currents at the two diameters. However, the back emf voltage will be added to the voltage applied to the payout motor when the tape is in motion. Therefore, in order to calculate the necessary applied voltage, the back emf voltage must be added so that the initial transient tension does not exceed the maximum tension. Thus, $$V_{min} = I_{min} R_A - V_{Gmax} \quad (25)$$

$$V_{max} = I_{max} R_A - V_{Gmin} \quad (26)$$

where $R_A$ is the motor armature resistance and $V_G$ is the back emf voltage. The maximum back emf will, of course, occur at maximum radial velocity when the reel diameter is minimum.

Once the applied voltages $V_{min}$ and $V_{max}$ have been calculated, the output of the steady state tension servo, i.e., the output of circuit 102, can be used to derive these voltages during operation because the tension output varies in a similar manner. Since the functions are linear, two equations can be written to describe the minimum and maximum reel diameter conditions and these two equations can be solved simultaneously. Thus, $$(V_{T1} - V_B) K = V_{min}$$

and $$(V_{T2} - V_B) K = V_{max}$$

where $V_{T1}$ is the voltage output of the tension servo, appearing at the output of compensation circuit 102, with the minimum reel diameter $D_{min}$ and $V_{T2}$ is the voltage output of the tension servo at $D_{max}$. Equations (27) and (28) can be solved for $V_B$ and K. The tension voltage is subtracted from a reference voltage ($V_B$) provided by a source 114, via a multiplexer 116 controlled by mode latch 108, and then multiplied by the gain K of an amplifier 104. The output of amplifier 104 is applied to a sample and hold circuit 106. The sample and hold circuit is held in the sample mode during running and is switched, by means of an output provided by mode latch 108, into the hold mode during stopping. Thus, after a stop command is received, the microprocessor will provide a command to mode latch 108 which, through the multiplexers 74 and 76, will short circuit the drive motor and apply the output of sample and hold circuit 106 to the power amplifier of the payout motor, via the appropriate multiplexer for a period of time. This time period, determined by microprocessor 56, is a function of tape position and speed. Thus, the microprocessor stores the present motor speed count of the faster motor when a stop command is received, determines the time it takes the motor to slow down to one-half speed, which corresponds to twice the stored count, and holds the applied voltage for an equal amount of time. The speed of the faster of the two motors is used in the interest of increasing count resolution. It is to be noted that there will be actually two speed reference voltage sources 114 and 114' (not shown) connected to multiplexer 116. The first of these voltage sources 114 supplies the above-mentioned $V_B$ reference. Reference voltage source 114' will supply a second reference voltage during "fast" forward or reverse tape motion and during a search mode to compensate for the doubling and tripling of tape speed during search and fast modes.

As also discussed above, the reflected inertial change at the drive hub is equal to the square of the ratio of the maximum reel diameter to the minimum reel diameter. In a standard Philips type cassette this ratio is approximately 5.5. Since it is desirable to get the tape up to speed as quickly as possible, compensation for these inertial changes must be provided if the system is to remain stable. These inertial changes directly effect the mechanical time constant and break point frequency of the system. Thus, in order to provide high gain at low frequencies, the compensation circuit including amplifier 64 and its associated lag-lead network 112 are employed. In accordance with the present invention, by changing the electrical compensation in the forward path of the speed servo loop as the system inertia changes, a fast and stable stop response can be achieved.

After the microprocessor 56 has calculated the tape velocity feedback signal, it determines the ratio of the encoder periods. In accordance with the invention the tape position is divided into a plurality of segments commensurate with predetermined values of inertial imbalance. In one reduction of practice of the invention, predetermined imbalance values commensurate with eight different segments were stored in memory 54. The encoder ratio is compared to these stored predetermined values to ascertain the present tape position. Each time the tape is stopped, the value in an inertial compensation latch 110, which may for example also comprise a four bit D-type latch, is updated to reflect the present tape position. The latch 110 controls a further multiplexer in lag-lead network 112. This further multiplexer switches one of eight resistors included in the lag-lead compensation circuit thus changing the electrical compensation. Each resistor value is optimized to provide the fastest and yet stable response over the range of the particular tape position commensurate with the information stored in latch 110. Accordingly, the effect of the inertial imbalance on the system is minimized using programmable electrical compensation. The present invention is thus an adaptive control since it varies the system compensation as a function of tape position.

While a preferred embodiment has been shown and described, various modifications and substitutions may be made thereto without departing from the spirit and scope of the the invention. Accordingly, it is to be understood that the present invention has been describedd by way of illustration and not limitation.

What is claimed is:

1. Apparatus for transferring a web between a pair of rotatable reels along a transfer path comprising:

first drive means for selectively imparting rotation in a first direction to a first of the reels, said first drive means including an electric motor having an output shaft coupled to the first reel;

second drive means for selectively imparting rotation in a second direction opposite to said first direction to the second reel whereby a web stored on the reels may be selectively transferred between said reels by exercising control over the operation of said drive means, said second drive means including an electric motor having an output shaft coupled to the second reel;

means for sensing the rotational speed of said drive means motor output shafts and providing signals commensurate therewith;

means for digitally encoding said sensed rotational speed signals;

means responsive to said digitally encoded signals for calculating the actual instantaneous linear velocity of the web at a point intermediate the reels and generating a signal commensurate therewith;

means for generating a desired web linear velocity reference signal;

means for comparing said signal commensurate with calculated linear velocity with said desired velocity reference signal to provide a linear velocity error signal;

means for generating signals indicative of the direction of web movement;

means responsive to an input command signal for generating a variable energizing signal for said first drive means motor, the magnitude of said energizing signal determining the motor output shaft rotational speed;

means responsive to an input command signal for generating a variable energizing signal for said second drive means motor, the magnitude of said energizing signal determining the motor output shaft rotational speed; and means responsive to said velocity error signal and to a signal indicative of web movement direction for delivering said velocity error signal as the input command signal to only the energizing signal generating means associated with the drive means which will produce the desired direction of web movement to vary the energization of the electric motor therein to obtain constant linear web velocity at the said intermediate point.

2. The apparatus of claim 1 wherein said means for calculating linear velocity comprises:

means for storing numbers $N_1$ and $N_2$ commensurate with the instantaneous rotational speed of each of said drive means motor output shafts;

means for storing a constant K commensurate with the characteristics of said sensing means, the length and thickness of the web and the minimum radius of the reels; and means responsive to said stored numbers and constant for solving the equation:

$$v = \frac{K}{\sqrt{N_1^2 + N_2^2}}$$

3. The apparatus of claim 2 further comprising:

means for measuring the motor current of each of said drive means motors and providing signals commensurate therewith;

means responsive to a signal commensurate with motor output shaft rotational speed and to a signal commensurate with the measured current of the same motor for producing a tension feedback signal which is a function of the product of rotational speed velocity and motor current;

means responsive to said signals indicative of web direction for applying the signals commensurate with motor current and motor shaft rotational speed of the drive means which does not have an energizing signal delivered thereto to said tension feedback signal producing means;

means for generating a tension reference signal;

means for combining said tension feedback signal and said tension reference signal to produce a tension control signal; and means for applying said tension control signal as an energizing signal to the motor of the drive means which does not have the energizing signal delivered thereto during periods when the linear velocity of the web is increasing or constant.

4. The apparatus of claim 3 wherein said tension reference signal generating means comprises:

means responsive to said signal commensurate with calculated linear velocity for generating a bias signal commensurate therewith.

5. The apparatus of claim 1 further comprising:

means for generating web movement start and stop command signals;

means for modifying said velocity error signal as a function of the inertial imbalance between the reels, the inertial imbalance being a function of the instantaneous rotational speed of the reels.

6. The apparatus of claim 5 wherein said means for modifying the velocity error signal as a function of inertial imbalance comprises:

means responsive to said signals commensurate with both of the sensed motor shaft rotational speeds to provide a speed ratio signal when a stop command signal is generated;

means for storing said speed ratio signals;

compensation circuit means for effecting stepwise modification of said velocity error signal; and means for applying said stored speed ratio signal to said compensation circuit means whereby said velocity error signal will be modified as a function of the stored speed ratio when web motion resumes in response to generated start command signal, the stored speed ratio being indicative of the inertial imbalance when the stop command signal next preceding the said start command signal was generated.

7. The apparatus of claim 6 wherein said means for storing speed ratio signals comprises:

means for comparing the instantaneous speed ratio signal with a plurality of predetermined values commensurate with the modification steps which may be performed by said compensation circuit means and storing the one of the predetermined values which is closest to the actual ratio.

8. The apparatus of claim 5 wherein said means for modifying the velocity error signal as a function of inertial imbalance comprises:

means responsive to said signals commensurate with both of the sensed motor shaft rotational speeds to provide a speed ratio signal when a stop command signal is generated;

means for storing said speed ratio signals;

compensation circuit means for effecting stepwise modification of said velocity error signal; and means for applying said stored speed ratio signal to said compensation circuit means whereby said velocity error signal will be modified as a function of the stored speed ratio when web motion resumes in response to a generated start command signal, the stored speed ratio being indicative of the inertial imbalance when the stop command signal next preceding the said start command signal was generated.

9. The apparatus of claim 8 wherein said means for storing speed ratio signals comprises:

means for comparing the instantaneous speed ratio signal with a plurality of predetermined values commensurate with the modification steps which may be performed by said compensation circuit means and storing the one of the predetermined values which is closest to the actual ratio.

10. The apparatus of claim 1 further comprising:

means for measuring the motor current of each of said drive means motors and providing signals commensurate therewith;

means responsive to a signal commensurate with motor output shaft rotational speed and to a signal commensurate with the measured current of the same motor for producing a tension feedback signal which is a function of the product of rotational speed and motor current;

means responsive to said signals indicative of web direction for applying the signals commensurate with motor current and motor shaft rotational speed of the drive means which does not have an energizing signal delivered thereto to said tension feedback signal producing means;

means for generating a tension reference signal;

means for combining said tension feedback signal and said tension reference signal to produce a tension control signal; and means for applying said tension control signal as an energizing signal to the motor of the drive means which does not have the energizing signal delivered thereto during periods when the linear velocity of the web is increasing or constant.

11. The apparatus of claim 10 wherein said tension reference signal generating means comprises:

means responsive to said signal commensurate with calculated linear velocity for generating a bias signal commensurate therewith.

12. The apparatus of claim 10 further comprising:

means for generating web movement start and stop command signals; and means for modifying said velocity error signal as a function of the inertial imbalance between the reels, the inertial imbalance being a function of the instantaneous rotational speed of the reels.

13. The apparatus of claim 7 further comprising:

means for modifying said velocity error signal as a function of the inertial imbalance between the reels, the inertial imbalance being a function of the instantaneous rotational speed of the reels.

14. The apparatus of claim 10 further comprising:

means for generating web movement start and stop command signals;

first means responsive to a stop command signal for terminating the energization of the one of said drive means motors which has an energizing signal delivered thereto;

means for generating and storing a signal which varies as a function of the quantity of the web on one of said reels;

means for storing a signal commensurate with the rotational speed of the motor of the fastest of said drive means when a stop command signal is generated; and means responsive to said stored motor speed signal and a signal commensurate with the sensed speed of the same motor for applying said signal which varies with web quantity as an energizing signal to the motor of said other drive means.

15. The apparatus of claim 14 wherein said means for applying said stored web quantity signal as a motor energizing signal comprises:

means responsive to stored and sensed motor speed signals for measuring the time required for the sensed speed to be reduced to one-half the stored speed and for generating a signal commensurate with the measured time; and means for causing application of said stored web quantity signal as a motor energizing signal until the motor speed is reduced to one-half the stored speed and for an additional period of time commensurate with said measured time.

16. The apparatus of claim 14 wherein said tension reference signal generating means comprises:

means responsive to said signal commensurate with calculated linear velocity for generating a bias signal commensurate therewith.

17. The apparatus of claim 14 wherein said means for generating a signal which varies as a function of the quantity of web on a reel comprises:

means for providing a second tension reference signal; and means for combining said second tension reference signal with said tension control signal.

18. The apparatus of claim 17 wherein said means for applying said stored web quantity signal as a motor energizing signal comprises:

means responsive to stored and sensed motor speed signals for measuring the time required for the sensed speed to be reduced to one-half the stored speed and for generating a signal commensurate with the measured time; and means for causing application of said stored web quantity signal as a motor energizing signal until the motor speed is reduced to one-half the stored speed and for an additional period of time commensurate with said measured time.

19. In apparatus for controlling the movement of a web between a payout reel and a takeup reel, said reels being mounted on rotatable hubs, said apparatus including a takeup reel drive motor and means for imposing a retarding torque on the payout reel, said retarding torque imposing means including a second motor, the improvement comprising:

means for sensing the rotational speed of the payout reel hub and generating a signal commensurate therewith;

means for sensing the motor current of said second motor and generating a signal commensurate therewith;

means responsive to said signals commensurate with payout motor current and payout reel hub speed for producing a tension feedback signal which is a function of the product of rotational velocity and motor current;

means for generating a tension reference signal;

means for combining said tension feedback signal and said tension reference signal to produce a tension control signal; and means for applying said tension control signal as an energizing signal to the motor of said retarding torque imposing means.

20. The apparatus of claim 19 wherein said apparatus further comprises:

means for sensing the rotational speed of the takeup reel hub and generating a signal commensurate therewith;

means responsive to said signals commensurate with payout and takeup reel hub speed for calculating the actual instantaneous linear velocity of the web at a point intermediate the reels and generating a signal commensurate therewith;

means for generating a desired web linear velocity reference signal;

means for comparing said signal commensurate with calculated linear velocity with said desired velocity reference signal to provide a linear velocity error signal; and means for applying said linear velocity error signal as the energizing signal to said takeup reel drive motor.

21. The apparatus of claim 20 wherein said tension reference signal generating means comprises:

means responsive to said signal commensurate with calculated linear velocity for generating a bias signal commensurate therewith.

22. The apparatus of claim 21 wherein said means for calculating linear velocity comprises:

means for storing numbers $N_1$ and $N_2$ commensurate with the instantaneous radial speed of each of said hubs;

means for storing a constant K commensurate with the characteristics of said sensing means, the length and thickness of the web and the hub radius; and means responsive to said stored numbers and constant for solving the equation:

$$v = \frac{K}{\sqrt{N_1^2 + N_2^2}}$$

23. In apparatus for controlling the movement of a web between a payout reel and a takeup reel, said reels being mounted on rotatable hubs, said apparatus including a takeup reel drive motor, the improvement comprising:

means for sensing the rotational speed of said hubs and providing signals commensurate therewith;

means responsive to at least one of said signals commensurate with sensed rotational speed for generating a signal commensurate with actual instantaneous web linear velocity at a point intermediate the reels;

means for generating a desired web linear velocity reference signal;

means for comparing said signals commensurate with actual and desired velocity to produce a velocity error signal;

means for applying said velocity error signal as the energizing signal to said takeup reel drive motor;

means for generating web movement start and stop command signals;

means responsive to a stop command signal and to said signals commensurate with sensed rotational speed for providing a speed ratio signal when a stop command signal is generated;

means for storing said speed ratio signals;

compensation circuit means for effecting stepwise modification of said velocity error signal; and means for applying said stored speed ratio signal to said compensation circuit means whereby said velocity error signal will be modified as a function of the stored speed ratio when web motion resumes in response to a generated start command signal, the stored speed ratio being indicative of the inertial imbalance when the stop command signal next preceding the said start command signal was generated.

24. The apparatus of claim 23 wherein said means for storing speed ratio signals comprises:

means for comparing the instantaneous speed ratio signal with a plurality of predetermined values commensurate with the modification steps which may be performed by said compensation circuit means and storing the one of the predetermined values which is closest to the actual ratio.

25. Apparatus for transferring a web between a first and second rotatable reels along a transfer path comprising:

first drive means for selectively driving said first reel in a first direction, said first drive means including a first electric motor having an output shaft coupled to the first reel;

second drive means for selectively imparting a drag torque in a second direction opposite to said first direction to the second, said second drive means including a second electric motor having an output shaft coupled to the second reel;

means for sensing the rotational speeds of said reels and providing signals commensurate therewith;

means for digitally encoding said sensed rotational speed signals;

means responsive to said digitally encoded signals for calculating the actual instantaneous linear velocity of the web at a point intermediate the reels and generating a signal commensurate therewith;

means for generating a desired web linear velocity reference signal;

means for comparing said signal commensurate with calculated linear velocity with said desired velocity reference signal to provide a linear velocity error signal;

first energizing means responsive to an input command signal for generating a variable energizing signal for said first drive means motor, the magnitude of said energizing signal determining the motor output shaft rotational speed;

second energizing means responsive to an input command signal for generating a variable energizing signal for said second drive means motor;

means responsive to said velocity error signal for delivering said velocity error signal as the input command signal to said first energizing signal generating means to vary the energization of said first electric motor to obtain constant linear web velocity at the said intemediate point;

means for measuring the motor current of said second drive means motors and providing signals commensurate therewith;

means responsive to a signal commensurate with the rotational speed of said second motor and to a signal commensurate with the measured current of said second motor for producing a tension feedback signal which is a function of the product of radial velocity and motor current;

means for generating a tension reference signal;

means for combining said tension feedback signal and said tension reference signal to produce a tension control signal; and means for applying said tension control signal as an energizing signal to said second motor during periods when the linear velocity of the web is increasing or constant.

26. The apparatus of claim 25 wherein said means for calculating linear velocity comprises:

means for storing numbers $N_1$ and $N_2$ commensurate with the instantaneous rotational speed of each of said drive means;

means for storing a constant K commensurate with the characteristics of said sensing means, the length and thickness of the web and the minimum radius of the reels; and means responsive to said stored numbers and constant for solving the equation:

$$v = \frac{K}{\sqrt{N_1^2 + N_2^2}}.$$

27. The apparatus of claim 25 wherein said tension reference signal generating means comprises:
means responsive to said signal commensurate with calculated linear velocity for generating a bias signal commensurate therewith.

28. The apparatus of claim 25 further comprising:
means for generating web movement start and stop command signals;
means for modifying said velocity error signal as a function of the inertial imbalance between the reels, the inertial imbalance being a function of the instantaneous radial speed of the reels.

29. The apparatus of claim 28 wherein said means for modifying the velocity error signal as a function of inertial imbalance comprises:
means responsive to said signals commensurate with both of the sensed reel rotational speeds to provide a speed ratio signal when a stop command signal is generated;
means for storing said speed ratio signals;
compensation circuit means for effecting stepwise modification of said velocity error signal; and
means for applying said stored speed ratio signal to said compensation circuit means whereby said velocity error signal will be modified as a function of the stored speed ratio when web motion resumes in response to generated start command signal, the stored speed ratio being indicative of the inertial imbalance when the stop command signal next preceding the said start command signal was generated.

30. The apparatus of claim 29 wherein said means for storing speed ratio signals comprises:
means for comparing the instantaneous speed ratio signal with a plurality of predetermined values commensurate with the modification steps which may be performed by said compensation circuit means and storing the one of the predetermined values which is closest to the actual ratio.

31. The apparatus of claim 25 further comprising:
means for generating web movement start and stop command signals;
first means responsive to a stop command signal for terminating the energization of said first motor;
means for generating and storing a signal which varies as a function of the quantity of the web on one of said reels;
means for storing a signal commensurate with the radial speed of said first motor when a stop command signal is generated; and
means responsive to said stored motor speed signal and a signal commensurate with the sensed speed of said first motor for applying said signal which varies with web quantity as an energizing signal to said second motor.

32. The apparatus of claim 31 wherein said means for applying said stored web quantity signal as a motor energizing signal comprises:

means responsive to stored and sensed motor speed signals for measuring the time required for the sensed speed to be reduced to one-half the stored speed and for generating a signal commensurate with the measured time; and
means for causing application of said stored web quantity signal as a motor energizing signal until the motor speed is reduced to one-half the stored speed and for an additional period of time commensurate with said measured time.

33. The apparatus of claim 31 wherein said tension reference signal generating means comprises:
means responsive to said signal commensurate with calculated linear velocity for generating a bias signal commensurate therewith.

34. The apparatus of claim 31 wherein said means for generating a signal which varies as a function of the quantity of web on a reel comprises:
means for providing a second tension reference signal; and
means for combining said second tension reference signal with said tension control signal.

35. The apparatus of claim 34 wherein said means for applying said stored web quantity signal as a motor energizing signal comprises:
means responsive to stored and sensed motor speed signals for measuring the time required for the sensed speed to be reduced to one-half the stored speed and for generating a signal commensurate with the measured time; and
means for causing application of said stored web quantity signal as a motor energizing signal until the motor speed is reduced to one-half the stored speed and for an additional period of time commensurate with said measured time.

36. The apparatus of claim 31 further comprising:
means for modifying said velocity error signal as a function of the inertial imbalance between the reels, the inertial imbalance being a function of the instantaneous rotational speed of the reels.

37. The apparatus of claim 36 wherein said means for modifying the velocity error signal as a function of inertial imbalance comprises:
means responsive to said signals commensurate with both of the sensed reel rotational speeds to provide a speed ratio signal when a stop command signal is generated;
means for storing said speed ratio signals;
compensation circuit means for effecting stepwise modification of said velocity error signal; and
means for applying said stored speed ratio signal to said compensation circuit means whereby said velocity error signal will be modified as a function of the stored speed ratio when web motion resumes in response to a generated start command signal, the stored speed ratio being indicative of the inertial imbalance when the stop command signal next preceding the said start command signal was generated.

38. The apparatus of claim 37 wherein said means for storing speed ratio signals comprises:
means for comparing the instantaneous speed ratio signal with a plurality of predetermined values commensurate with the modification steps which may be performed by said compensation circuit means and storing the one of the predetermined values which is closest to the actual ratio.

* * * * *